J. HERZOG.
INCANDESCENT LAMP.
APPLICATION FILED AUG. 21, 1908.
1,062,591.
Patented May 27, 1913.
2 SHEETS—SHEET 1.
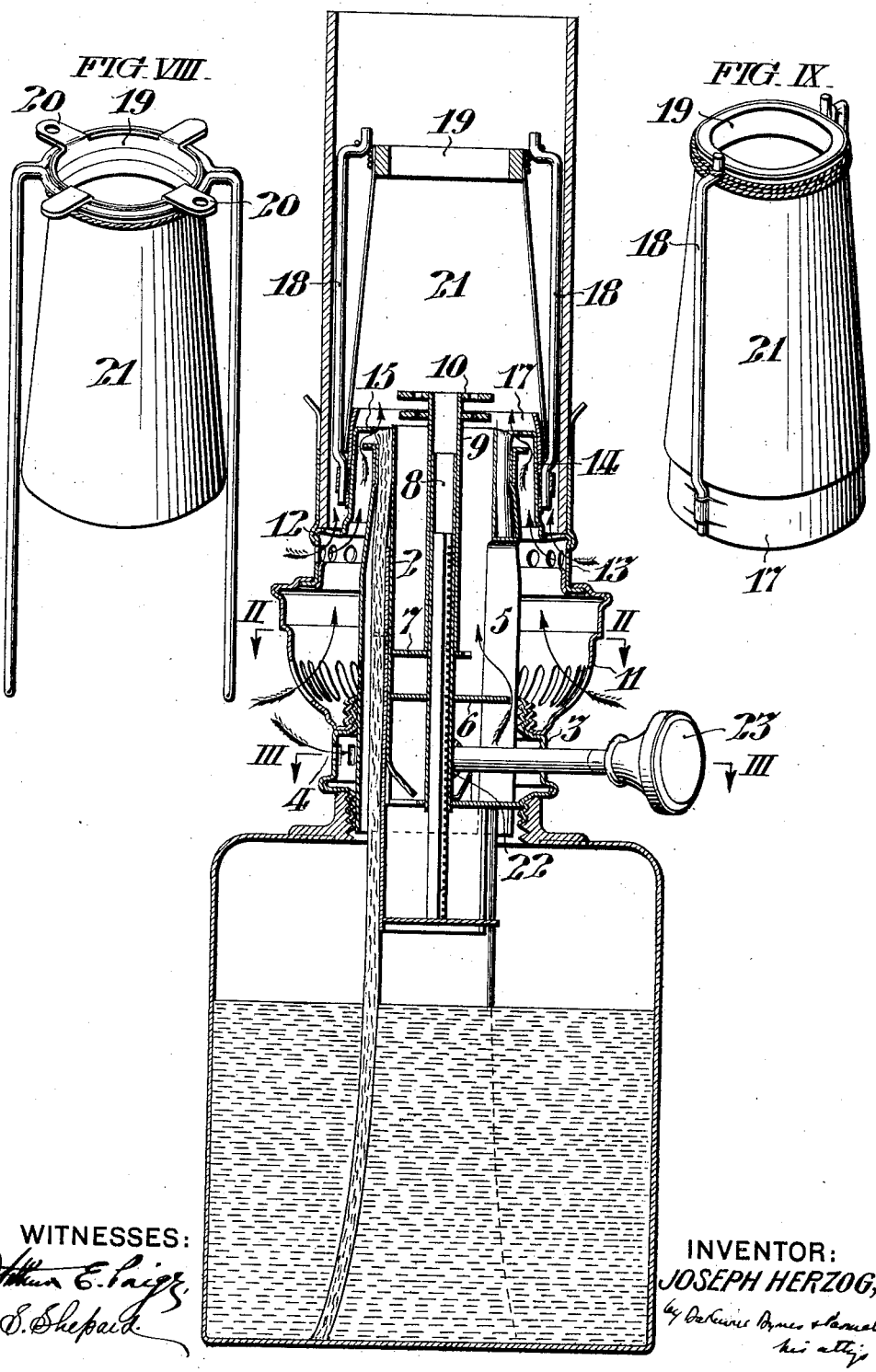
WITNESSES:
INVENTOR:
JOSEPH HERZOG, J. HERZOG.
INCANDESCENT LAMP.
APPLICATION FILED AUG. 21, 1908.
1,062,591.
Patented May 27, 1913.
2 SHEETS—SHEET 2.
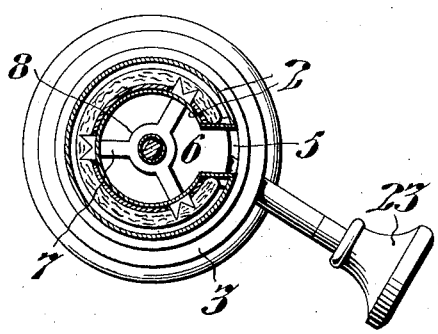
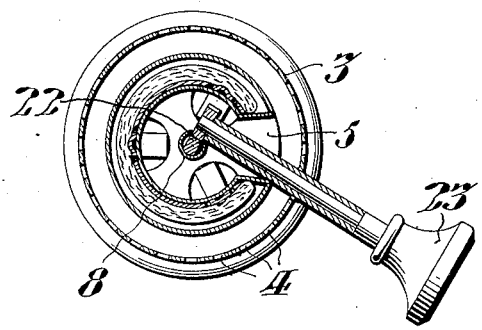
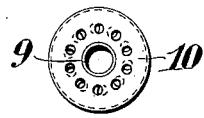
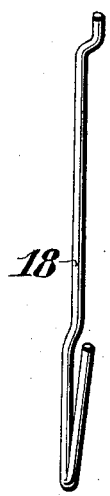
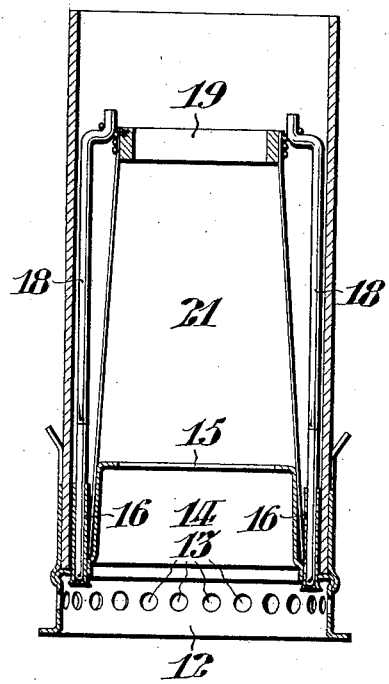
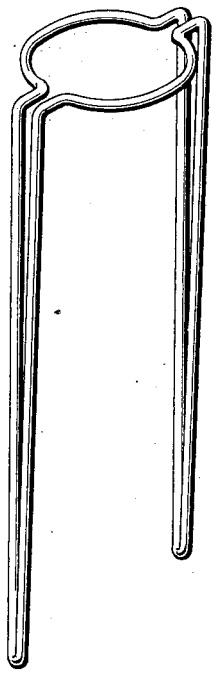
WITNESSES:
INVENTOR:
JOSEPH HERZOG,

UNITED STATES PATENT OFFICE.

JOSEPH HERZOG, OF NEW YORK, N. Y., ASSIGNOR TO ARTHUR O. GRANGER, OF MONTREAL, CANADA.

INCANDESCENT LAMP.

1,062,591. Specification of Letters Patent. Patented May 27, 1913.

Application filed August 21, 1908. Serial No. 449,578.

*To all whom it may concern:*

Be it known that I, JOSEPH HERZOG, of the borough of Manhattan, city, county, and State of New York, have invented a new and useful Improvement in Incandescent Lamps, of which the following is a full, clear, and exact description, reference being had to the accompanying drawings, forming part of this specification, in which—

Figure 1 is a sectional side elevation of a lamp embodying my invention; Figs. 2 and 3 are cross sections on the lines II—II and III—III, respectively, of Fig. 1; Fig. 4 is a top plan view of the spreader; Fig. 5 is a vertical section on a large scale, of the chimney holder and mantle support; Fig. 6 is a detail of Fig. 5; Fig. 7 is a detail of a modified mantle support, and Figs. 8 and 9 are perspective views of other forms of mantle supports.

My invention relates to kerosene lamps and is designed to provide an improved burner, mantle and support which will enable a kerosene burner to be used with a mantle and produce sufficient heat from the burner to raise the mantle to incandescence.

The invention consists in providing a device for changing yellow flame to blue flame, and also a system of supporting the mantle for preventing soot.

In the drawings, 2 represents the wick tube, which is annular in form and tapered toward its top. This tapering presses the tubular wick firmly together in its upper portion, so that when the burner is heated there is no space for sucking up the kerosene. The combustion is produced from the vapor, this vapor being formed by the action of the heated tubes on the liquid in the wick.

The inner wall of the wick tube extends slightly above the outer wick tube, as I find that this insures an even burning of the wick. The base portion 3 of the burner is provided with a row of outer holes 4, through which air is drawn in to cool the burner and prevent heat passing into the font. One side of the wick tube is provided with a through slot 5 which leads down below the air holes.

6 is an inner plate which, with the skeleton 7, supports the rod or tube 8 over which is slipped the tube 9 carrying the spreader 10. This supporting plate extends part way within the side slot, so as to allow the air entering through the holes in the burner base to rise and be drawn within the slot, into the inside of the wick tube, whence it passes up the spreader. This spreader preferably has two plates, each provided with a row of holes, one row being staggered slightly relatively one to the other, as shown in Fig. 4, so that the air is given a swirling motion. This air changes the yellow into a blue flame.

11 is the burner basket, which is screwed upon the base and has suitable perforations to allow cold air to enter and pass up the burner. When the burner is heated the flame will be between the two currents of air, the inner current of warm air and the outer current of cold air. When the gallery 12 is applied, these two currents force the yellow flame back, and through the oxygen supplied, a blue Bunsen flame is obtained for heating the mantle.

The gallery 12, which is secured on the basket in any suitable manner, as by a bayonet joint, is also provided with holes 13 through which air enters and flows up to the outside of the mantle, through opposite slots in the base of the gallery. This air flows up around the outside of the mantle and aids in keeping it clean and preventing soot. A portion of this entering air also mingles with the air entering through the basket holes and passes up in the annular sheet around the flame. The mantle cap 14 of the gallery is provided with an inturned flange 15, which is of sufficient width to contact with the upper end of the wick and prevent its being turned up beyond this point. If the wick were turned up beyond this point the flame would flicker and finally go out.

In the form of Figs. 1 and 5, sockets 16 are provided between the gallery and the mantle cap. Instead of these sockets I may provide a base ring 17, to which the supporting wires 18 are attached, as in Fig. 9. In either case the supporting wires 18 extend up to engage a ring 19. This ring may be provided with side lugs 20, which are engaged by the hook shaped upper ends of the wires. The tapering mantle 21 has its upper end secured to this ring, while its lower end surrounds the mantle cap. Any ordinary form of wick lifter may be employed, as shown at 22, the handle being shown at 23.

In Fig. 8 I show a modified form of upper supporting ring which may be used either with the rods 18, or with the doubled integral loop form of rods and ring, shown in Fig. 7.

When an ordinary mantle is used, the hole within the upper gathered portion is so small that as the flame increases in size the tongues of flame will pass through the fabric. As it is impossible to supply cold air at these points, soot will be deposited, these deposits increasing until finally no more air can pass through the texture of the mantle and the heat will be forced down into the burner, causing injury and possible explosion. To avoid this danger, I have constructed the mantle with a larger opening at the top, it being preferably in frusto-conical form. The flame is thus allowed to spread freely toward the top and pass out through the upper opening without depositing soot on the mantle.

The upper mantle ring may be constructed of any refractory metal or material, such as magnesia or nickel or platinum wire.

The rising current of cold air around the mantle before described also aids in preventing soot. In ordinary mantle burners the blackening and soot formation is due to an insufficient supply of cold air, and this difficulty is overcome both with my improved burner and by the open top mantle.

The burner and mantle may be used with a central draft lamp by suitable changes in the wick lifter, inner diaphragms, etc., the air in this case rising through the draft tube in the lamp bowl.

It is found in the use of my improved lamp that there is substantially no soot formation, the hot Bunsen flame being evenly distributed and passing out through the top with a single tongue of flame, the mantle is raised to a bright incandescence, and soot formation is substantially prevented.

Variations may be made in the form and arrangement of the burner, the mantle and its support without departing from my invention.

I claim:

In an incandescent wick lamp, a burner tube within the wick extending to the upper portion thereof, a tube on the exterior of the wick, the upper edge of which is slightly below the edge of the wick, an outwardly extending flange at the upper edge of the tube on the exterior of the wick, and a gallery having a burner cap provided with a flange extending inwardly over the flange on the exterior tube, the upper edge of the flange on the gallery being approximately on a line with the upper edge of the tube within the wick; substantially as described.

In testimony whereof, I have hereunto set my hand.

JOSEPH HERZOG.

Witnesses:
C. P. BYRNES,
A. E. WALLACE.

---

Copies of this patent may be obtained for five cents each, by addressing the "Commissioner of Patents, Washington, D. C."